United States Patent
Kim et al.

(10) Patent No.: US 8,771,146 B2
(45) Date of Patent: Jul. 8, 2014

(54) METHOD OF CONTROLLING TRANSMISSION OF VEHICLE

(75) Inventors: Sung Yeol Kim, Suwon-si (KR); Seung Min Lee, Ansan-si (KR); Choung Wan Son, Seoul (KR); Seok Young Shin, Hwaseong-si (KR); Ju Hyun Nam, Bucheon-si (KR); Sung Yop Lee, Yongin-si (KR); Kwang Min Won, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 84 days.

(21) Appl. No.: 13/303,992

(22) Filed: Nov. 23, 2011

(65) Prior Publication Data
US 2012/0312652 A1    Dec. 13, 2012

(30) Foreign Application Priority Data
Jun. 9, 2011    (KR) .................. 10-2011-0055633

(51) Int. Cl.
*B60W 10/06* (2006.01)
*B60W 10/10* (2012.01)

(52) U.S. Cl.
USPC ........................................... 477/115

(58) Field of Classification Search
CPC .............. B60W 10/06; B60W 10/113; B60W 2710/021; B60W 2710/022
USPC ........................................... 477/115
See application file for complete search history.

(56) References Cited

U.S. PATENT DOCUMENTS

| | | | |
|---|---|---|---|
| 5,172,602 A | 12/1992 | Jürgens et al. | |
| 5,863,276 A | 1/1999 | Lee | |
| 5,915,512 A | 6/1999 | Adamis et al. | |
| 6,009,768 A * | 1/2000 | Hoshiya et al. ............. | 74/336 R |
| 6,679,134 B2 | 1/2004 | Shigyo | |
| 6,826,974 B2 * | 12/2004 | Kobayashi ...................... | 74/339 |
| 6,832,978 B2 | 12/2004 | Buchanan et al. | |
| 6,887,184 B2 * | 5/2005 | Buchanan et al. ............ | 477/174 |
| 8,256,312 B2 | 9/2012 | Hatori et al. | |
| 2004/0166992 A1 * | 8/2004 | Buchanan et al. ............ | 477/181 |
| 2005/0288149 A1 | 12/2005 | Kuhstrebe et al. | |
| 2010/0184561 A1 | 7/2010 | Schaarschmidt et al. | |
| 2011/0306464 A1 | 12/2011 | Holland et al. | |
| 2012/0312109 A1 * | 12/2012 | Kim et al. ........................ | 74/325 |
| 2012/0312110 A1 * | 12/2012 | Kim et al. ........................ | 74/325 |
| 2012/0312652 A1 * | 12/2012 | Kim et al. ..................... | 192/3.54 |

FOREIGN PATENT DOCUMENTS

| | | |
|---|---|---|
| EP | 1 450 075 A2 | 8/2004 |
| FR | 2 837 256 A1 | 3/2003 |
| JP | 2-11646 U | 1/1990 |
| JP | 2002-122157 A | 4/2002 |

(Continued)

*Primary Examiner* — Edwin A Young
(74) *Attorney, Agent, or Firm* — Morgan, Lewis & Bockius LLP

(57) ABSTRACT

A method of controlling a transmission of a vehicle may include generating a first synchronization force between a shift gear of a target gear and an output shaft to shift gears from a current gear to a lower gear set as the target gear in response to deceleration of the vehicle, so as to form a first synchronization, removing the first synchronization force between the shift gear and the output shaft after the generating of the first synchronization force, and generating a second synchronization force between the shift gear of the target gear and the output shaft after the removing of the first synchronization force, so as to form a second synchronization.

15 Claims, 3 Drawing Sheets

(56) References Cited

FOREIGN PATENT DOCUMENTS

| JP | 2008-82526 | A | 4/2008 |
| JP | 2011-2007 | A | 1/2011 |
| KR | 10-0316912 | B1 | 12/2001 |
| KR | 10-2006-0134423 | A | 12/2006 |
| KR | 10-2008-0029137 | A | 4/2008 |
| WO | WO 2004/028850 | A1 | 4/2004 |

* cited by examiner

METHOD OF CONTROLLING TRANSMISSION OF VEHICLE

CROSS-REFERENCE TO RELATED APPLICATIONS

The present application claims priority to Korean Patent Application No. 10-2011-0055633 filed on Jun. 9, 2011, the entire contents of which is incorporated herein for purposes by this reference.

BACKGROUND OF THE INVENTION

1. Field of the Invention

The present invention relates generally to methods of controlling transmissions of vehicles and, more particularly, to a technique for preventing a shift shock from occurring when shifting gears in response to deceleration of a vehicle that is provided with an AMT (automated manual transmission) including a DCT (double clutch transmission), etc.

2. Description of Related Art

A process of downshifting when a vehicle provided with a conventional DCT decelerates will be described with reference to FIG. 1.

When the vehicle decelerates, a transmission controller drives an actuator so that a corresponding synchronizer is operated to achieve gear engagement of a target gear that is lower than the current gear.

Typically, the actuator linearly moves a sleeve of the synchronizer to conduct synchronization and engagement of a related shift gear.

As stated above, when the actuator begins to operate, the sleeve compresses a synchronizer ring towards a clutch gear of the target gear by means of a key so that the synchronization begins (at a point of time T1 of FIG. 1). A second input shaft which engages with the shift gear of the target gear is synchronized with an output shaft, and the rpm of the second input shaft thereby increases.

During this process, an increase of the rpm of the second input shaft results from transmission of rotating force of the output shaft to the second input shaft through the synchronizer. This means the torque of the output shaft is used to increase the speed of the inertial mass pertaining to the second input shaft. Due to the torque transmitted from the output shaft to the second input shaft, backlash of elements, such as gears, etc., from the second input shaft to the output shaft are arranged in one direction.

After, the synchronization has been conducted as described above, the rpm of the second input shaft becomes equal to that of the output shaft. Subsequently, when the sleeve is further moved by the operation of the actuator, the sleeve passes over the synchronizer ring and the key. Thereby, the compression force with which the sleeve pushed the synchronizer ring is removed, resulting in a momentary breakdown of the synchronization (from T2 to T3).

Thereafter, when the sleeve is further moved by the operation of the actuator, the sleeve engages with the clutch gear of the target gear, thus completing the gear shifting (after T3).

During breakdown of the synchronization, if there is no frictional resistance induced as a result of the rotation of the second input shaft, the second input shaft is in free rotation and thus maintains the rpm when in the synchronized state. The rpm of the output shaft reduces because the vehicle is decelerating. As a result, just before the sleeve engages with the clutch gear, the rpm of the second input shaft exceeds that of the output shaft.

In this state, if the sleeve just moves and engages with the clutch gear, torque is applied to the elements in the direction in which the second input shaft that is faster than the output shaft rotates the output shaft. Thus, the backlash of the elements that have been arranged in one direction when the synchronization begins are rearranged in the reverse direction. Because of such a phenomenon, the elements, such as gears, between the second input shaft and the output shaft that have been rotating at high speeds collide with each other, thus causing shock.

Such shift shock and noise which are induced during the above-mentioned process of the conventional technique deteriorate the quietness of the vehicle, causes a user discomfort, and reduce the marketability of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of controlling a transmission of a vehicle in such a way that, when shifting gears from the current gear to a lower gear in response to deceleration of the vehicle provided with a transmission mechanism in which an actuator operates a sleeve to conduct synchronization, shift shock and noise are prevented from being induced by the backlash occurring between elements between an input shaft and an output shaft, thus enhancing the gear shift quality, thereby improving the quietness and riding comfort of the vehicle, and enhancing the marketability of the vehicle.

In an aspect of the present invention, a method of controlling a transmission of a vehicle, may include generating a first synchronization force between a shift gear of a target gear and an output shaft to shift gears from a current gear to a lower gear set as the target gear in response to deceleration of the vehicle, so as to form a first synchronization, removing the first synchronization force between the shift gear and the output shaft after the generating of the first synchronization force, and generating a second synchronization force between the shift gear of the target gear and the output shaft after the removing of the first synchronization force, so as to form a second synchronization.

The removing of the first synchronization force begins when an rpm of an input shaft reaches a predetermined target rpm after the output shaft may be synchronized with the input shaft through the shift gear of the target gear by the first synchronization force.

The predetermined target rpm may be set in response to an rpm of the output shaft that linearly reduces as time passes.

The predetermined target rpm may be set as an rpm of the input shaft, when the rpm of the input shaft becomes equal to the rpm of the output shaft after linearly increasing towards the rpm of the output shaft at the first synchronization.

The generating of the first synchronization force may include controlling an actuator to linearly move a sleeve of the target gar towards a clutch gear of the target gear, the removing of the first synchronization force may include controlling the actuator to retract the sleeve of the target gear in a direction away from the clutch gear, and the generating of the second synchronization force may include controlling the actuator to linearly move the sleeve towards the clutch gear again.

The generating of the first synchronization force may include linearly moving the sleeve towards the clutch gear of the target gear, and maintaining a position of the sleeve within a predetermined range.

The linearly moving of the sleeve towards the clutch gear of the target gear may include linearly increasing a displacement of the sleeve as time passes, and the maintaining the position of the sleeve within the predetermined range may include maintaining the position of the sleeve within a range in which the first synchronization force may be generated between the sleeve of the target gear and the clutch gear.

The linearly moving of the sleeve towards the clutch gear of the target gear may include linearly increasing a displacement of the sleeve as time passes, and the maintaining the position of the sleeve within the predetermined range may include maintaining the position of the sleeve between a predetermined upper limit and a predetermined lower limit.

The removing of the first synchronization force may be begun by retracting the sleeve out of the range within which the first synchronization force may be generated between the sleeve of the target gear and the clutch gear, and may include maintaining the retracted sleeve for a predetermined time period, wherein the maintaining of the retracted sleeve continues until a difference in rpm between the input shaft and the output shaft increases to a degree to which backlash of elements between the input shaft and the output shaft, which may have been arranged in one direction during the generating of the first synchronization force, may be able to be rearranged in a reverse direction by the generating of the second synchronization force.

In another aspect of the present invention, a method of controlling a transmission of a vehicle, may include during a process of generating a synchronization force between a clutch gear of a target gear and an output shaft for engagement therebetween to shift gears from a current gear to a lower gear as the target gear in response to deceleration of the vehicle, temporarily removing the synchronization force.

The temporarily removing may be begun when an rpm of an input shaft reaches a predetermined target rpm after the output shaft may be synchronized with the input shaft through a shift gear of the target gear by the synchronization force generated between the clutch gear of the target gear and the output shaft.

After the temporarily removing, an additional synchronization may be conducted, and the temporarily removing continues until a difference in rpm between the input shaft and the output shaft increases to a degree to which backlash of elements between the input shaft and the output shaft may be able to be arranged by the second synchronization.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
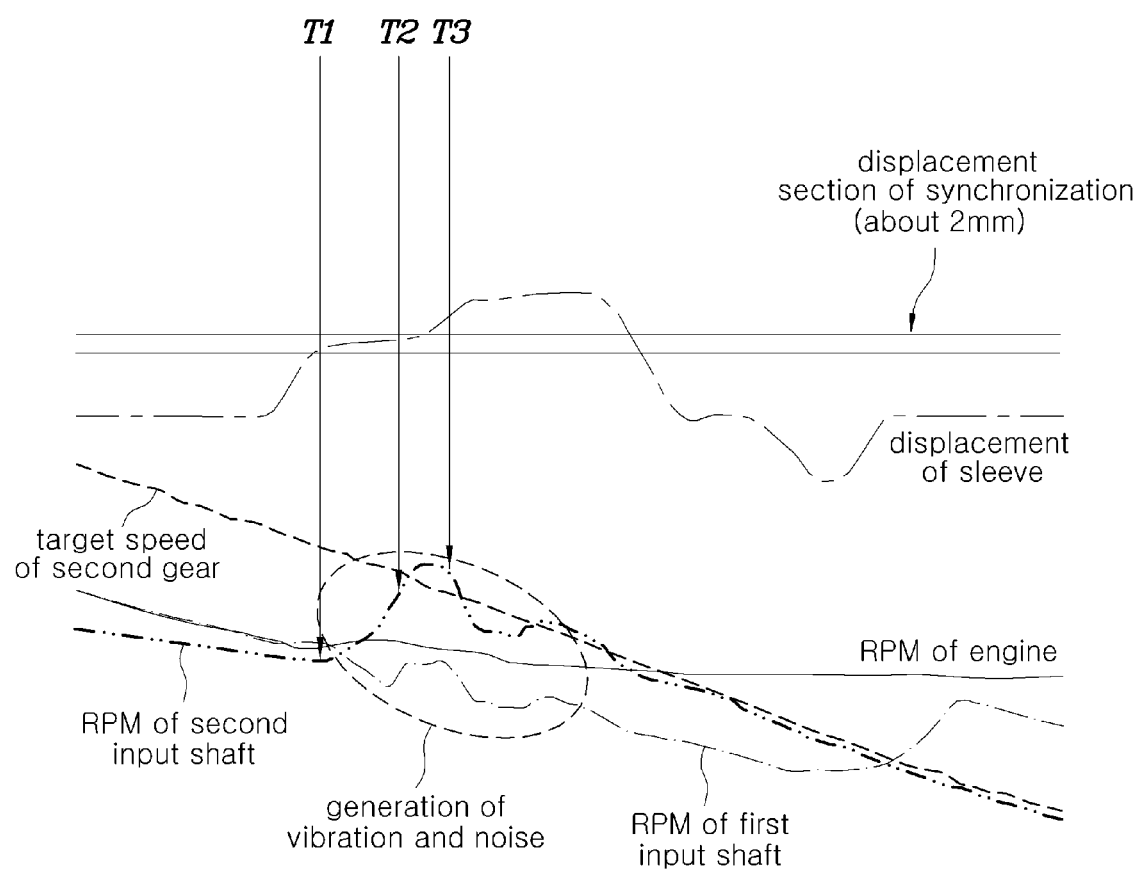
FIG. 1 is a graph illustrating downshifting when a vehicle provided with a conventional DCT decelerates.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described in detail with reference to the attached drawings.

Figure 2:
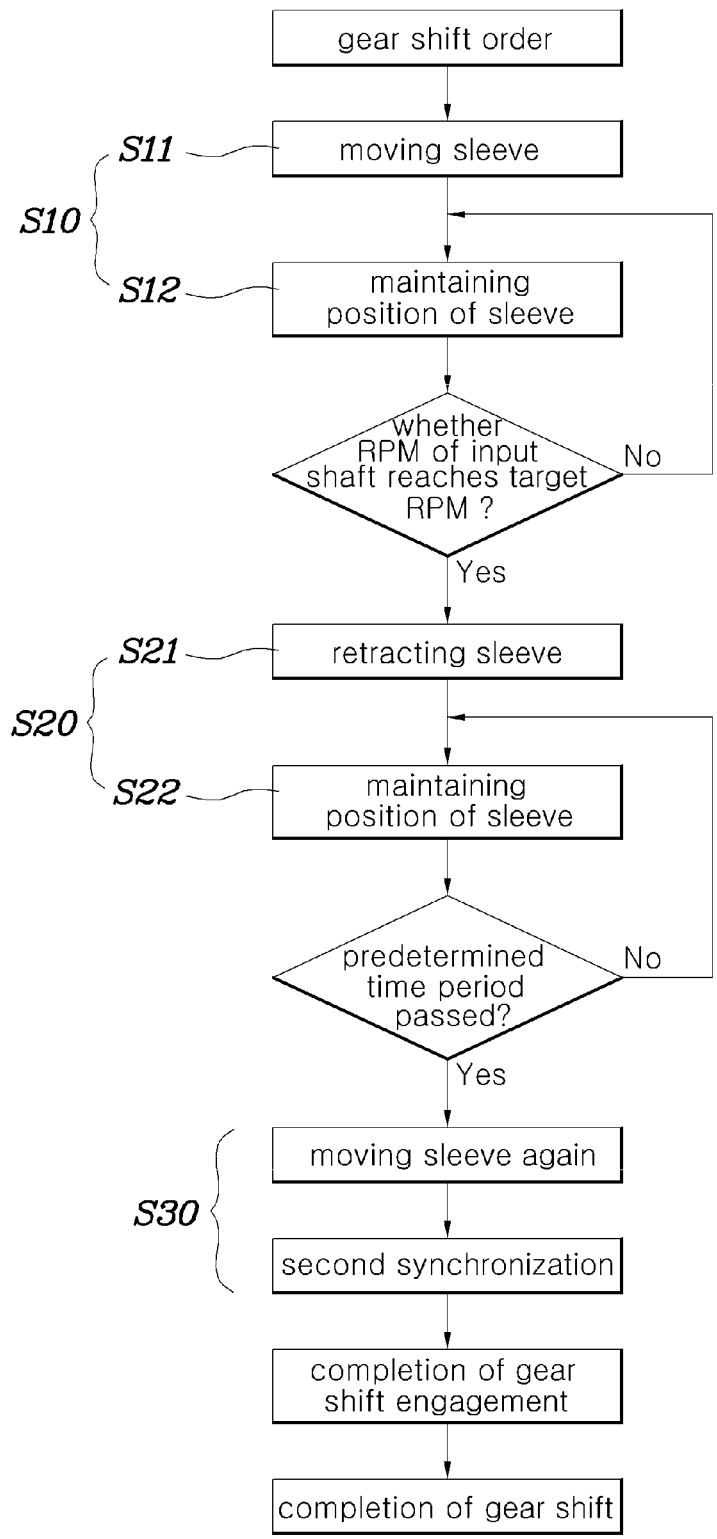
FIG. 2 is a flowchart of a method of controlling a transmission of a vehicle according to an exemplary embodiment of the present invention.
Figure 3:
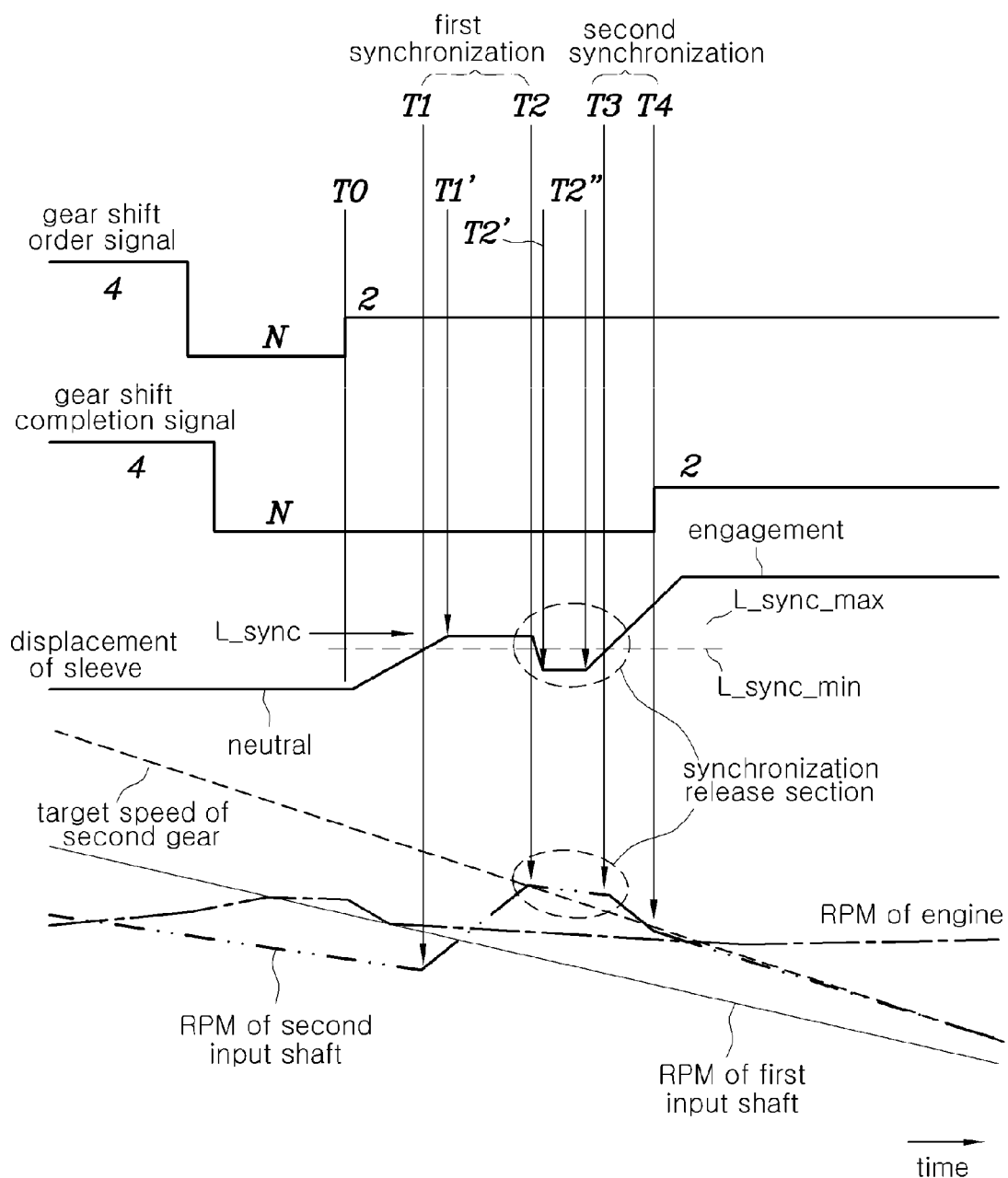
FIG. 3 is a graph illustrating a gear shift according to the control method of FIG. 2.

Referring to FIGS. 2 and 3, a method of controlling a transmission of a vehicle according to an exemplary embodiment of the present invention includes a first synchronization step S10, a synchronization release step S20 and a second synchronization step S30. At the first synchronization step S10, when shifting gears from the current gear to a lower gear set as a target gear, is required in response to deceleration of the vehicle, a first synchronization force is generated between a shift gear of the target gear and an output shaft. At the synchronization release step S20, after the first synchronization step S10, the first synchronization force is removed from between the shift gear and the output shaft. At the second synchronization step S30, after the synchronization release step S20, second synchronization force is generated between the shift gear of the target gear and the output shaft.

As such, in an exemplary embodiment of the present invention, when gears are shifted from the current gear to the target lower gear in response to deceleration of the vehicle, synchronization force is generated between a clutch gear of the target gear and the output shaft, and gear engagement eventually takes place. During this process, the synchronization release step S20 at which the synchronization force is temporarily removed takes place. Thus, the input shaft and the output shaft that were in a backlash arrangement state induced at the first synchronization step S10 are smoothly rearranged in the reverse direction at the synchronization release step S20 and the second synchronization step S30. Therefore, unlike the conventional technique, shift shock and noise can be prevented from occurring due to the change in the direction of the backlash.

For reference, FIG. 3 illustrates a gear shift of a DCT including a first input shaft and a second input shaft. The target gear, into which the gear is required to be shifted, is a second gear, and the input shaft connected to the target gear denotes the second input shaft. Hence, judging from conditions of FIG. 3, the input shaft mentioned in the description of the present invention means the second input shaft.

The first synchronization step S10 of the present embodiment includes controlling an actuator to linearly move a sleeve of the target gear towards the clutch gear of the target gear. The synchronization release step S20 includes controlling the actuator to retract the sleeve in the direction away from the clutch gear. The second synchronization step S30 includes controlling the actuator to linearly move the sleeve towards the clutch gear again.

Further, a synchronizer of the transmission that is premised in the present embodiment is configured in such a way that: a synchronizer ring is compressed towards the clutch gear by linear movement of the sleeve to begin synchronization, when the sleeve passes over the synchronizer ring and engages with the clutch gear, gear shifting is completed, the clutch gear which is integrated with the shift gear of the target gear is operated such that power is transmitted from a hub that is disposed at the center of the sleeve to the shift gear via the sleeve and the clutch gear, and the actuator linearly moves the sleeve under the control of a transmission controller.

In the present embodiment, the first synchronization step S10 includes a first sub-step S11 and a second sub-step S12. At the first sub-step S11, the sleeve is linearly moved towards the clutch gear of the target gear. At the second sub-step S12, the position of the sleeve is controlled to be in a predetermined range.

The first sub-step S11 includes linearly increasing the displacement of the sleeve as time passes during the time period from T0 to T1'. The second sub-step S12 includes maintaining the position of the sleeve within a range in which a synchronization force is generated between the sleeve of the target gear and the clutch gear.

At the second sub-step S12, the position of the sleeve may be controlled to be fixed. Alternatively, as shown in FIG. 3, a method may be used, in which the upper limit (L_sync_max) and the lower limit (L_sync_min) between which synchronization force can be generated are set and the position (L_sync) of the sleeve is controlled to be between the upper limit and the lower limit.

The synchronization release step S20 pertains to a range from T2 to T3. The synchronization release step S20 is conducted when the rpm of the input shaft reaches a predetermined target rpm after the output shaft is synchronized with the input shaft through the shift gear of the target gear by the synchronization force that is generated at the first synchronization step S10.

It is preferable that the predetermined target rpm be set in response to the rpm of the output shaft which linearly reduces as time passes.

In other words, the rpm of the input shaft, when it becomes equal to the rpm of the output shaft after linearly increasing towards the rpm of the output shaft at the first synchronization step S10, is set as the predetermined target rpm. When the rpm of the input shaft reaches the predetermined target rpm, the synchronization release step S20 is conducted.

As shown by a section from T2 to T2' of FIG. 3, the synchronization release step S20 is begun by a third sub-step S21 at which the sleeve is retracted backwards out of the range within which the synchronization force is generated between the sleeve of the target gear and the clutch gear. The synchronization release step S20 includes a fourth sub-step S22 at which the position of the sleeve that has been retracted backwards is held during a section from T2' to T3.

That is, when the rpm of the input shaft reaches the predetermined target rpm, the sleeve is retracted backwards at the third sub-step S21 to enter a state in which the synchronization force is not generated, thus releasing the synchronized state, in other words, entering a synchronization release state. The synchronization release state is maintained during the fourth sub-step S22.

The fourth sub-step S22 continues for a predetermined time period that is set as the time period it takes until a difference in rpm between the input shaft and the output shaft increases to a degree to which the backlash of elements between the input shaft and the output shaft, which have been arranged in one direction at the first synchronization step S10, can be rearranged in the reverse direction at the second synchronization step S30.

In detail, at the first synchronization step S10, because the rpm of the output shaft is higher than that of the input shaft which is connected to the shift gear of the target gear, backlash between elements between the input shaft and the output shaft, for example, the hub, the sleeve, the clutch gear, the shift gear, etc. of the synchronizer pertaining to the target gear, is arranged in the direction in which the output shaft rotates the input shaft. Such a backlash arrangement state is rearranged in the reverse direction at the synchronization release step S20 and the second synchronization step S30. A certain amount of difference in rpm between the input shaft and the output shaft, to which the above-mentioned conversion of the backlash arrangement state can be conducted, is ensured for the predetermined time period of the fourth sub-step S22.

After the synchronization release step S20 has begun, the input shaft, the rpm of which has become equal to that of the output shaft, freely rotates without being subject to any restriction other than its own rotational frictional resistance, and the rpm of the output shaft slowly reduces in response to deceleration of the vehicle. Thus, a difference in rpm between the input shaft and the output shaft increases. After T3 (in more detail, after T2" of FIG. 3), when the second synchronization step S30 is conducted, the sleeve slowly moves towards the clutch gear of the target gear again so that the synchronization between the output shaft and the input shaft begins. At this time, because the rpm of the input shaft is higher than that of the output shaft, torque is applied to the elements between the input shaft and the output shaft in the direction opposite to the direction of the backlash arrangement of the first synchronization step S10. Thus, backlash of the corresponding elements is arranged in the direction in which the input shaft operates the output shaft. As a result, the backlash of the elements, which is arranged in one direction at the first synchronization step S10, is rearranged in the reverse direction.

As such, when the second synchronization step S30 is conducted and then the sleeve eventually completely engages with the clutch gear of the target gear, the gear shifting has completed. After that time, power is transmitted from the input shaft to the output shaft. Thus, the backlash arrangement of the related elements is maintained during the power transmission process. Therefore, unlike the conventional technique, shift shock and noise can be prevented from occurring due to the change in the direction of the backlash.

Of course, the amounts of speed and force with which the sleeve is operated at the second synchronization step S30 are set the appropriate levels to prevent more backlash or collision between the gears from occurring. Preferably, such a speed and force can be determined by tests, analysis or the like.

As described above, in a method of controlling a transmission of a vehicle according to an exemplary embodiment of the present invention, when shifting gears from the current gear to a lower gear in response to deceleration of the vehicle provided with a transmission mechanism in which an actuator operates a sleeve to conduct synchronization, shift shock and noise can be prevented from being induced by backlash occurring between elements between an input shaft and an output shaft. Therefore, the gear shift quality is enhanced, thus improving the quietness and riding comfort of the vehicle, and enhancing the marketability of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a transmission of a vehicle, comprising:
   generating a first synchronization force between a shift gear of a target gear and an output shaft to shift gear ratio from a current gear ratio to a lower gear ratio of the target gear in response to deceleration of the vehicle, so as to form a first synchronization;
   removing the first synchronization force between the shift gear and the output shaft after the generating of the first synchronization force; and
   generating a second synchronization force between the shift gear of the target gear and the output shaft after the removing of the first synchronization force, so as to form a second synchronization.

2. The method as set forth in claim 1, wherein the removing of the first synchronization force begins when an rpm of an input shaft reaches a predetermined target rpm after the output shaft is synchronized with the input shaft through the shift gear of the target gear by the first synchronization force.

3. The method as set forth in claim 2, wherein the predetermined target rpm is set in response to an rpm of the output shaft that linearly reduces as time passes.

4. The method as set forth in claim 2, wherein the predetermined target rpm is set as a rpm of the input shaft, when the rpm of the input shaft becomes equal to the rpm of the output shaft after linearly increasing towards the rpm of the output shaft at the first synchronization.

5. The method as set forth in claim 1, wherein
   the generating of the first synchronization force includes controlling an actuator to linearly move a sleeve of the target gar towards a clutch gear of the target gear;
   the removing of the first synchronization force includes controlling the actuator to retract the sleeve of the target gear in a direction away from the clutch gear; and
   the generating of the second synchronization force includes controlling the actuator to linearly move the sleeve towards the clutch gear again.

6. The method as set forth in claim 5, wherein the generating of the first synchronization force includes:
   linearly moving the sleeve towards the clutch gear of the target gear; and
   maintaining a position of the sleeve within a predetermined range.

7. The method as set forth in claim 6,
   wherein the linearly moving of the sleeve towards the clutch gear of the target gear includes linearly increasing a displacement of the sleeve as time passes, and
   wherein the maintaining the position of the sleeve within the predetermined range includes maintaining the position of the sleeve within a range in which the first synchronization force is generated between the sleeve of the target gear and the clutch gear.

8. The method as set forth in claim 6,
   wherein the linearly moving of the sleeve towards the clutch gear of the target gear includes linearly increasing a displacement of the sleeve as time passes, and
   wherein the maintaining the position of the sleeve within the predetermined range includes maintaining the position of the sleeve between a predetermined upper limit and a predetermined lower limit.

9. The method as set forth in claim 5, wherein the removing of the first synchronization force is begun by retracting the sleeve out of the range within which the first synchronization force is generated between the sleeve of the target gear and the clutch gear, and wherein the removing of the first synchronization force further includes maintaining the retracted sleeve for a predetermined time period.

10. The method as set forth in claim 9, wherein the maintaining of the retracted sleeve continues for the predetermined time period until a difference in rpm between the input shaft and the output shaft increases to a degree to which backlash of elements between the input shaft and the output shaft, which have been arranged in one direction during the generating of the first synchronization force, is able to be rearranged in a reverse direction by the generating of the second synchronization force.

11. A method of controlling a transmission of a vehicle, comprising:
   during a process of generating a synchronization force between a clutch gear of a target gear and an output shaft for engagement therebetween to shift gear ratio from a current gear ratio to a lower gear ratio of the target gear in response to deceleration of the vehicle, temporarily removing the synchronization force when an rpm of an input shaft reaches a predetermined target rpm.

12. The method as set forth in claim 11, wherein the temporarily removing is begun when the rpm of the input shaft reaches the predetermined target rpm after the output shaft is synchronized with the input shaft through a shift gear of the target gear by the synchronization force generated between the clutch gear of the target gear and the output shaft.

13. The method as set forth in claim 12, wherein the predetermined target rpm is set in response to an rpm of the output shaft that linearly reduces as time passes during downshifts.

14. The method as set forth in claim 12, wherein the predetermined target rpm is set as a rpm of the input shaft, when the rpm of the input shaft becomes equal to the rpm of the output shaft after linearly increasing towards the rpm of the output shaft.

15. The method as set forth in claim 11, wherein
   after the temporarily removing, an additional synchronization is conducted, and
   the temporarily removing continues until a difference in rpm between the input shaft and the output shaft increases to a degree to which backlash of elements between the input shaft and the output shaft is able to be arranged by the second synchronization.

* * * * *